May 7, 1968  D. V. CHENOWETH  3,381,708
FLUID FLOW REGULATOR
Filed Sept. 7, 1965
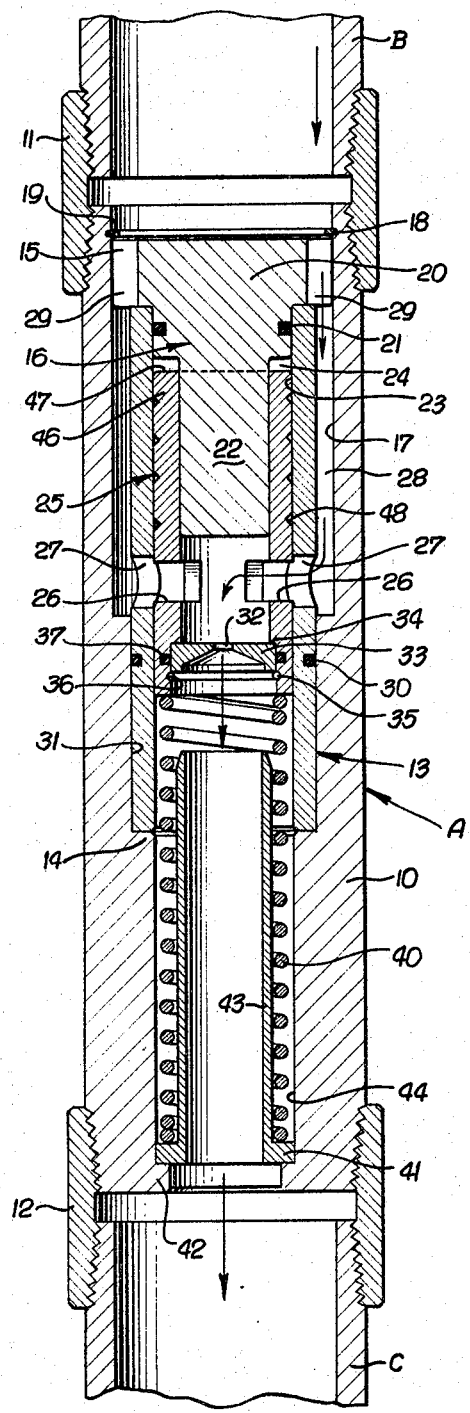
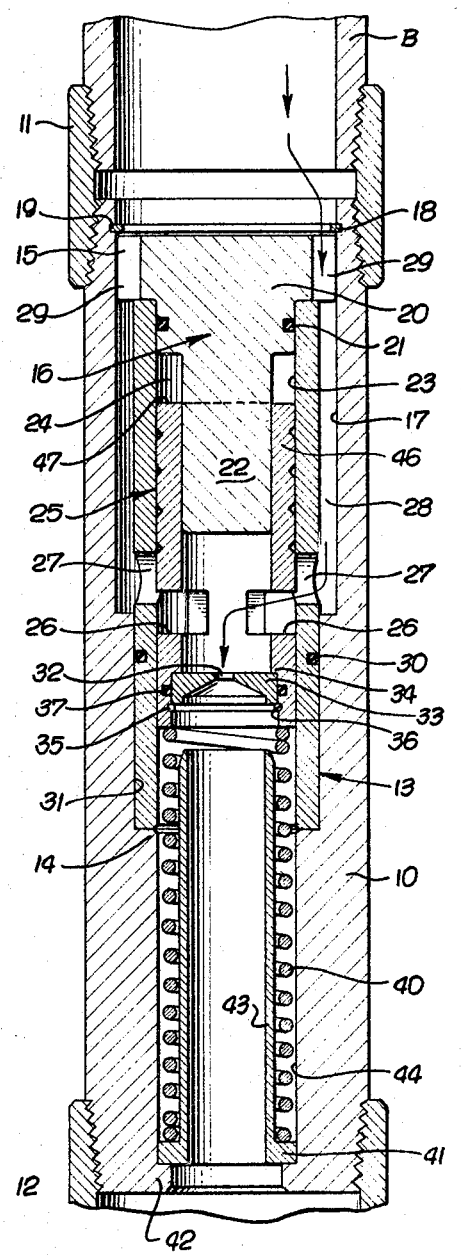
INVENTOR.
DAVID V. CHENOWETH
By Bernard Kriegel
ATTORNEY.

3,381,708
FLUID FLOW REGULATOR
David V. Chenoweth, Houston, Tex., assignor to Baker Oil Tools, Inc., City of Commerce, Calif., a corporation of California
Filed Sept. 7, 1965, Ser. No. 485,440
6 Claims. (Cl. 137—504)

ABSTRACT OF THE DISCLOSURE

A fluid flow regulator in which a regulator piston sleeve is slidable in a body and carries an orifice through which fluid flows and tends to shift the sleeve against the force of a spring along body ports to throttle the flow of fluid therethrough and maintain the fluid pressure drop through the orifice substantially constant, the piston sleeve extending into an annular body cylinder containing fluid to dampen the movement of the piston sleeve in the body.

---

The present invention relates to regulating apparatus, and more particularly to apparatus for maintaining the flow of fluids in a system at a substantially constant rate.

Flow regulators have been used for maintaining the flow of fluid substantially constant despite change in pressure upstream or downstream of the regulator. In prior regulators, uniform fluid flow is not achieved, since the movable regulator parts effect an overadjustment or overcorrection and oscillate or reciprocate through a relatively wide range in response to change in pressure differential. In addition, the flow of fluid through the regulator tends to fluid cut or erode its parts, and also tends to deposit solids or trash in its passages that interfere with its proper regulation of the fluid flow.

Accordingly, it is an object of the present invention to provide a fluid flow regulator capable of maintaining a constant rate of fluid flow through it despite variations in fluid pressure, and in which overadjustment or overregulation is greatly minimized.

Another object of the invention is to provide a fluid flow regulator for maintaining fluid flow at a substantially constant rate which is less susceptible to erosive wear and to trash accumulation in its passages.

This invention possesses may other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through a flow regulator embodying the invention, with its regulator parts in a full opening condition;

FIG. 2 is a view similar to FIG. 1 illustrating the regulator valve throttling the flow of fluid therethrough.

A fluid flow regulator A is illustrated in the drawings in connection with an inlet pipe or tubing B and an outlet pipe or tubing C. It is adapted to maintain the flow of fluid through the tubing sections B, C at a substantially constant rate, despite variations in pressure either upstream or downstream of the regulator apparatus A.

As disclosed, the fluid flow regulator includes a valve body or housing 10 suitably connected to the inlet and outlet tubing members B, C, as by threadedly connecting one end of the housing to a coupling 11, which is, in turn, connected to the inlet tubing B, and by threadedly securing the outlet end of the housing to a coupling 12 threadedly secured to the outlet tubing C. Disposed within the tubular housing 10 is a cylinder sleeve 13, the downstream end of which bears against a housing shoulder 14, the upstream end bearing against an outwardly directed flange portion 15 of an end closure or plug 16 disposed with the cylinder 13 and extending outwardly into engagement with the wall 17 of an enlarged internal diameter portion of the housing. The plug or end closure 16 is held in place against the cylinder sleeve 13 by a split, snap retaining ring 18 overlying the outer end of the flange 15 and disposed within an internal circumferential groove 19 in the housing.

The end closure plug 16 has a head portion 20 disposed within the cylinder sleeve, leakage between the two being prevented by a suitable side seal ring 21 on the head engaging the wall of the sleeve. A stem 22 extends from the head into the cylinder sleeve 13 and is in spaced relation to the inner wall 23 of the cylinder sleeve to provide an annular cylinder spaced 24 therebtween in which a regulator sleeve or piston 25 is movable longitudinally. This piston has diametrically opposed side ports 26 therethrough below the inner end of the stem 22 that are communicable with diametrically opposed side ports 27 extending through the cylinder sleeve 13. The cylinder sleeve ports 27 open outwardly into an annular passage 28 between the inner wall 17 of the housing and the cylinder sleeve, which communicates with circumferentially spaced, longitudinally extending flutes or passages 29 through the flange 15, so that fluid from the inlet tubing B can pass through the passages 29 to the annular space 28, and then through the cylinder sleeve ports 27 and the piston ports 26 to the interior of the piston or regulator sleeve 25. Leakage of fluid between the cylinder sleeve 13 and regulator body or housing 10 in a direction downstream of the annular passage 28 is prevented by a suitable side seal ring 30 on the cylinder sleeve engaging the wall 31 of the housing below the annular passage, which has an internal diameter conforming to the external diameter of the cylinder sleeve.

Fluid passing through the ports 26 to the interior of the regulator piston flows through a choke orifice 32 formed centrally through an orifice plate 33 bearing against a shoulder 34 on the piston, and which is retained in place by a suitable split snap ring 35 overlying the downstream side of the plate and located within an internal circumferential groove 36 in the piston. Leakage of fluid around the exterior of the orifice plate 33 is prevented by a suitable side seal ring 37 on the piston engaging the periphery of the plate. The fluid discharging through the orifice 32 flows through the cylinder sleeve 13 therebelow and through the housing 10 into the outlet tubing C.

The regulator sleeve or piston 25 is urged in an upstream direction by a helical compression spring 40 disposed in the housing, with its downstream end bearing against a sleeve flange 41 resting upon a housing shoulder 42 and its upstream end bearing against the downstream end of the regulator piston 25 and tending to urge the latter in an upstream direction in which its ports 26 are fully aligned with the cylinder sleeve ports 27, producing a fully opened condition between them. The fluid flowing through the orifice 32 tends to shift the piston 25 in a downstream direction partially across the cylinder sleeve ports 27 to throttle the flow of fluid therethrough, depending upon the pressure differential upstream and downstream of the orifice, and in that manner effects a regulation of the flow of fluid through the regulator valve. The fluid discharging from the orifice 32 passes downwardly through a protective sleeve 43 within the helical compression spring 40 integral with the flange 41, and which is in spaced relation to the wall 44 of the housing or body 10. This sleeve 43, 41 not only serves to protect the spring 40 against the action of the fluid discharging from the choke orifice 32, but it also serves to center and retain the spring centered within the housing 10.

A damper device is embodied in the flow regulator to reduce the extent of oscillation or reciprocation of the piston 25 within the cylinder sleeve 13 in response to variations in pressure drop through the orifice 32. As shown, the downstream portion 46 of the piston is slidable within the annular cylinder space 24 between the closure stem 22 and the cylinder sleeve 13. Fluid within the piston and in the ported region of the cylinder sleeve 13 can pass through the clearance spaces between the stem 22 and the inner surface of the piston and between the inner wall 23 of the cylinder sleeve and the outer surface of the piston into and out of the end annular cylinder space 24 between the closure head and the downstream end 47 of the piston. The clearance spaces are relatively small and actually function as flow restricting orifices, so that the movement of the sleeve 25 in a direction inwardly and outwardly of the annular cylinder 24 must either displace fluid from the end portion of the annular cylinder 24 or cause fluid to flow through the clearance spaces into the annular cylinder. To ensure the presence of fluid flow into and out of the annular cylinder, the periphery of the piston on the downstream sides of its ports 26 may have a plurality of longitudinally spaced circumferential shallow grooves 48. The piston 25, in moving longitudinally within the cylinder 24, has its movement damped by the necessity of displacing the fluid from the annular cylinder 24 at the end of the piston, or having such fluid flow thereinto.

In the operation of the flow regulator A, fluid flows from the inlet tubing B through the passages 29 and the annular passage 28 inwardly through the cylinder sleeve ports 27 and the piston ports 26 to the interior of the piston, and will then pass axially through the choke orifice 32 to discharge therefrom. The pressure differential across the orifice plate determines the position of the piston ports with respect to the cylinder sleeve ports 27 and the throttling action of the piston on the cylinder sleeve ports, as illustrated more clearly in FIG. 2. If the upstream pressure tends to increase relative to the downstream pressure or the downstream pressure tends to decrease relative to the upstream pressure, the result will be an increase in the pressure differential across the orifice plate 33, causing the fluid to shift the regulator piston 25 against the force of the spring 40 in a downstream direction, further closing the piston ports 26 and sleeve ports 27 and throttling the flow of fluid therethrough so as to decrease the pressure on the upstream side of the orifice plate. On the other hand, if the pressure upstream of the orifice plate 33 tends to decrease relative to the downstream fluid pressure or the downstream fluid pressure tends to increase relative to the upstream fluid pressure, the net result will be a decrease in the pressure differential across the orifice plate, causing the spring 40 to shift the piston in an upstream direction to increase the effective area of its ports 27, 26 and thereby decrease the throttling effect therethrough, allowing the pressure on the upstream side of the orifice plate to increase.

The throttling action of the piston 25 in varying the effective area of its side ports 26 will vary the pressure on the upstream side of the orifice plate 33 with respect to the pressure on the downstream side of the orifice plate and maintain the pressure differential or drop through the choke orifice 32 at a substantially constant value, so that the flow of fluid through the choke orifice will remain at a constant rate. Thus, whether the downstream pressure tends to vary or the upstream pressure tends to vary, the regulator piston 25 will shift to correspondingly vary its throttling action on the ports 27 and maintain the pressure differential across the choke orifice substantially constant.

During the longitudinal shifting of the piston 25 within the cylinder 24, a damping action occurs thereon to reduce the tendency of the piston to overcorrect under the action of the spring 40 and the changing pressure differential. Thus, assuming a relative decrease in the pressure upstream of the orifice plate 33, the spring 40 would shift the piston in an upstream direction to increase the effective port area to bring the inlet pressure at the orifice plate to a desired value. However, the piston would be overshifted by the spring, causing the effective area of the ports 27 to increase to too great an extent, thereby overly increasing the pressure at the upstream side of the orifice. As a result, such greater pressure differential would then shift the piston 25 in a downstream direction against the force of the spring 40 and would tend to continue shifting it to an abnormal extent, so that the effective area of the piston ports would then be overly decreased, the spring then reshifting the piston in the upstream direction. The result would be an oscillation or reciprocation of the piston or sleeve 25 over an excessive range, causing the pressure differential across the orifice 32 to vary substantially, resulting in a variable flow of fluid through the orifice, rather than a desired constant flow. Accordingly, the regulator could not perform its regulating function properly.

In the present case, the incorporation of the damper device in the flow regulator prevents such overshifting of the piston 25, since movement of the piston in an upstream direction under the influence of the spring 40 can occur in a retarded fashion only, due to the necessity of forcing the fluid in the annular cylinder 24 out through the clearing spaces along the piston. Similarly, shifting of the piston in the opposite direction tends to create a low pressure in the annular cylinder space 24, in which fluid must pass through the clearance spaces thereinto, again retarding the longitudinal movement of the ported sleeve or piston within the cylinder in a downstream direction. As a result, the shifting of the piston 25 is damped, and the effective flow area of the ports 27 is controlled within close limits so as to maintain the desired constant pressure differential across the orifice 32, which is accompanied by a constant volumetric rate of flow of fluid or liquid through the orifice.

The regulator illustrated also minimizes fluid erosion on its parts. It is to be noted that the fluid flows inwardly through diametrically opposite ports 27 and 26, the opposed fluid streams impinging upon one another rather than directly upon the parts of the regulator itself. From the interior of the piston 25, the fluid then flows in a straight line axial direction through the orifice 32, and straight through the protector sleeve 43 and spring 40 into the outlet tubing C. Such straight line flow does not adversely affect the parts of the apparatus, there being an absence of erosive wear thereon.

In addition to the elimination or minimizing of erosive wear on the parts, the direction of flow through the regulator valve prevents sand or other trash from building up in the region of the ports 26, 27. Such undesired substances in the fluid stream impinge upon one another as a result of passing inwardly through the diametrically opposite ports 27 and 26, and are then directed in a straight line through the orifice 32, to be carried completely out of the regulator and into the outlet tubing C. This is to be distinguished from flow of the fluid in a reverse direction, in which the fluid would first pass through the orifice 32 and then outwardly through the ports 26, 27 into the housing 10, the sand or other trash settling in the housing passage 28. Such outward direction of the fluid flow would also cause the fluid to impinge upon the housing 10 and tend to wear it away.

I claim:

1. In fluid flow regulator apparatus: body means; sleeve valve means in said body means; one of said means having a fluid passage; said sleeve valve means being shiftable in said body means to control the effective area of said passage through which fluid can flow; spring means for urging said valve means in said body means in one direction increasing the effective area of said passage;

orifice means secured to said sleeve valve means through which fluid can flow and tend to shift said sleeve valve means in the opposite direction to decrease the effective area of said passage; said body having an annular cylinder adapted to contain fluid; said sleeve valve means extending into and slidable along walls of said cylinder and engageable with the fluid therein to damp the movement of said sleeve valve means in said body means.

2. In fluid flow regulator apparatus: body means having an inlet port; sleeve valve means shiftable in said body means along said port to control the effective area of said port through which fluid can flow into said sleeve valve means; spring means for urging said sleeve valve means in said body means in one direction increasing the effective area of said ports; orifice means secured to said sleeve valve means through which fluid from said portion and within said sleeve valve means can flow and tend to shift said sleeve valve means in the opposite direction to decrease the effective area of said port; said body means having an annular cylinder adapted to contain fluid; said sleeve valve means extending into and slidable along walls of said annular cylinder in engagement with the fluid therein to damp the movement of said sleeve valve means in said body means.

3. In fluid flow regulator apparatus: body means; sleeve valve means in said body means; one of said means having opposed inlet ports through which fluid can flow into the interior of said sleeve valve means; said sleeve valve means being shiftable in said body means to control the effective area of said ports through which fluid can flow; spring means for urging said sleeve valve means in said body means in one direction increasing the effective area of said ports; orifice means secured to said sleeve valve means downstream of said ports through which fluid can flow and tend to shift said sleeve valve means in the opposite direction to decrease the effective area of said ports; said body means having an annular cylinder adapted to contain fluid; said sleeve valve means extending into and slidable along walls of said cylinder to be acted upon by fluid therein to damp the movement of said sleeve valve means in said body means.

4. In fluid flow regulator apparatus: body means having opposed inlet ports; sleeve valve means having opposed ports and shiftable in said body means to control the extent of alignment and disalignment of said ports of said valve means with said ports of said body means to control the effective area of said sleeve valve ports through which fluid can flow to the interior of said sleeve valve means; spring means for urging said sleeve valve means in said body means in one direction tending to more fully align said ports of said sleeve valve means with said ports of said body means; orifice means secured to said sleeve valve means through which fluid from within said sleeve valve means can flow and tend to shift said sleeve valve means in the opposite direction to disalign said sleeve valve means ports and said body means ports; said body means having an annular cylinder adapted to contain fluid; said sleeve valve means being shiftable in and slidable along walls of said cylinder to damp the movement of said sleeve valve means in said body means.

5. In fluid flow regulator apparatus: body means; sleeve valve means in said body means; one of said means having opposed inlet ports through which fluid can flow into the interior of said sleeve valve means; said sleeve valve means being shiftable in said body means to control the effective area of said ports through which fluid can flow; spring means for urging said sleeve valve means in said body means in one direction increasing the effective area of said ports; orifice means secured to said sleeve valve means downstream of said ports through which fluid can flow and tend to shift said sleeve valve means in the opposite direction to decrease the effective area of said ports; an end member in said body means spaced therefrom to provide an annular cylinder space therewith, said cylinder space being adapted to contain fluid; said sleeve valve means extending into said cylinder space and having working clearance with said end member and body means to permit fluid to pass along said sleeve valve means to and from said cylinder space and effect a damping action on said sleeve valve means in its movement within said body means.

6. In fluid flow regulator apparatus: body means; sleeve valve means in said body means; one of said means having a fluid passage; said sleeve valve means being shiftable in said body means to control the effective area of said passage through which fluid can flow; spring means for urging said sleeve valve means in said body means in one direction increasing the effective area of said passage; orifice means secured to said sleeve valve means through which fluid can flow and tend to shift said sleeve valve means in the opposite direction to decrease the effective area of said passage; an end member in said body means and spaced therefrom to define an annular cylinder space therewith adapted to contain fluid; said sleeve valve means extending into said cylinder space and having working clearance with said end member and body means to permit fluid to pass through said working clearance to and from said cylinder space in effecting a damping action on said sleeve valve means during its movement in said body means.

References Cited

UNITED STATES PATENTS

| | | | |
|---|---|---|---|
| 1,933,852 | 11/1933 | Hahn | 137—504 |
| 2,776,056 | 1/1957 | Douglas | 137—504 X |

FOREIGN PATENTS

| | | |
|---|---|---|
| 905,572 | 9/1962 | Great Britain. |
| 977,381 | 12/1964 | Great Britain. |

M. CARY NELSON, *Primary Examiner.*

R. J. MILLER, *Assistant Examiner.*